Feb. 4, 1958 F. D. OESTERLE ET AL Re. 24,423

VOTIVE CANDLE

Original Filed May 27, 1954

INVENTORS

Frank Dwight OESTERLE

Laurier BAILLARGEON

BY Robic & Bastien

ATTORNEYS

United States Patent Office

Re. 24,423
Reissued Feb. 4, 1958

24,423

VOTIVE CANDLE

Frank D. Oesterle, West Englewood, N. J., and Laurier Baillargeon, St. Constant, Quebec, Canada Original No. 2,713,256, dated July 19, 1955, Serial No. 432,848, May 27, 1954. Application for reissue July 19, 1957, Serial No. 674,005

6 Claims. (Cl. 67—21)

Matter enclosed in heavy brackets [ ] appears in the original patent but forms no part of this reissue specification; matter printed in italics indicates the additions made by reissue.

The present invention relates to votive candles.

Existing votive candles are manufactured with a metal detail in the base of the candle to support the wick. After the candle has burnt out these metal details remain in the bottom of the glass container or cup and the accumulation of said metal details cause the succeeding candles to tilt so that the flame is thrown onto the side of the glass cup which results in glass breakage.

Accordingly, the general object of the present invention is the provision of an improved votive candle so constructed as to eliminate glass breakage and the necessity of a constant cleaning of the glass cup.

A more specific object of the present invention is the provision of an adapter insertable into a cup for votive candles and provided with means to support the wick of the candle until the latter has completely burnt out thereby leaving no wax or wick residue in the cup and thus enabling a new candle to be inserted into the cup without having to remove the adapter.

Still another important object of the present invention is the provision of an adapter [to] *of* the character described comprising a non-burning or non-combustible disk with a centrally projecting tube adapted to engage a recess made in the base of the candle body so as to hold the wick in upright position until the latter has completely burnt out.

Yet another important object of the present invention is the provision of an adapter of the character described having a projecting tube provided with lateral openings for admission of combustion air during the last stage of burning of the candle body.

Yet another important object of the present invention is the provision of a votive candle assembly of the character described in which the several component parts are relatively inexpensive and simple to manufacture.

The foregoing and other important objects of the present invention will become more apparent during the following disclosure and by referring to the drawings in which.

Figure 5:
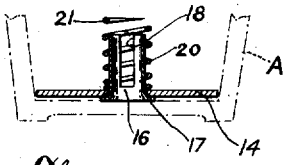
Figure 5 is a section of a second embodiment of the adapter according to the invention.

Referring now more particularly to the drawings in which like reference characters indicate like elements throughout, the letter A indicates a cup shaped container made of glass or transparent plastic and preferably coloured. The cup or container A is outwardly tapered to receive the tapered body of fuel or candle B.

According to the invention, the candle B is provided at its base 1 with an annular recess 2 defining a tapered central body projection 3 which depends from the bottom 4 of the annular recess 2 and which has its outer end 5 disposed at a point that is lying above the base 1 of the candle B.

The candle B is provided with a wick 6 extending centrally through the body and through the projection 3 to terminate at the outer end 5 of said projection 3.

A first embodiment of the adapter, according to the invention, is shown in Figures 1 to 4. This adapter consists in a substantially thick disk 7 made of non-combustible material and having a side 8 which may be tapered or straight depending upon whether the side of the candle body B is tapered or straight. Said disk 7 has a central hole for receiving a tight fitting short tube 9. The tube 9 is provided with a plurality of lateral circular openings 10, some of them disposed adjacent the outer end 11 of the tube 9 and others disposed adjacent the top face 12 of the disk 7.

Figure 2:
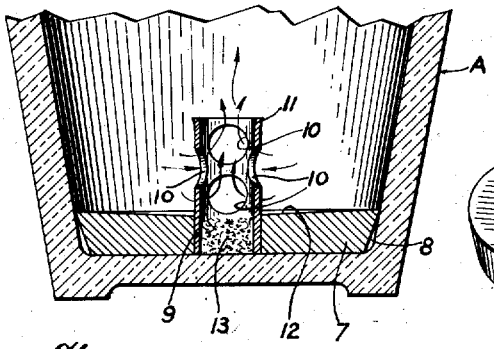
Figure 2 is a longitudinal section showing part of the cup and the adapter according to Figure 1 in position in the bottom of said cup.

As shown in Figure 2, the top face 12 of the disk 7 is slightly concave and the outer end 11 of the tube 9 is outwardly flared to receive the tapered projection 3, of the candle body B.

Into the bottom of the tube 9 may be packed a permanent wicking 13 preferably made of entangled Nichrome wire or a combination of wire and asbestos.

The wick 6 is preferably of a type which burns out completely and leaves no residue.

The adapter 7 remains permanently in the bottom of the cup A. The votive candle B is dropped into the cup A and its projection 3 engages within the tube 9 of the adapter. When the candle B has burnt down to the level of the tube 9, the latter maintains the wick 6 in upstanding position and prevents it from tilting over to cause breakage of the cup A by the flame. During the last stage of burning, combustion air enters the tube 9 through the lateral openings 10. The concave or inclined top face 12 of the disk 7 causes the flow of the melted wax towards the tube and into the wicking 13 where it is burnt. Therefore, burning does not stop until the wax has completely disappeared, and the cup is *then* ready to receive a new candle body B because the necessity of cleaning the cup is eliminated.

Figure 6:
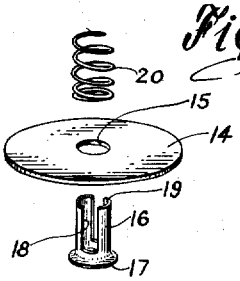
Figure 6 is an exploded perspective view of the adapter shown in Figure 5.
Figure 4:
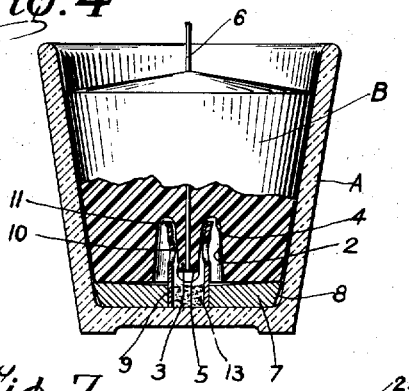
Figure 4 is a longitudinal section showing the candle in proper position in the cup.
Figure 3:
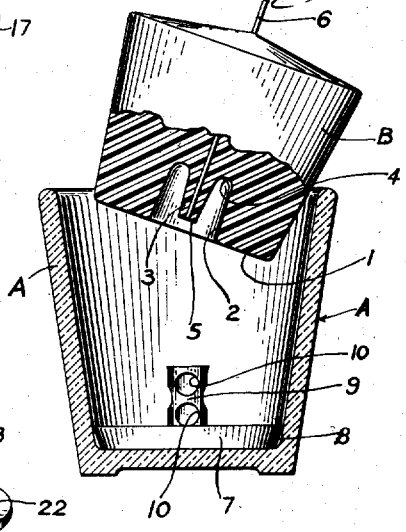
Figure 3 is a longitudinal section showing how the candle body is inserted into the cup.

Figures 5 and 6 show another embodiment of the adapter, according to the invention, which consists in a thin metal disk 14 provided with a central hole 15 for removably receiving a nipple 16 provided with an end flange 17 adapted to abut the edges of the hole 15. The nipple 16 is provided with longitudinally extending slots 18 opening at the outer end 19 of the nipple 16 and extending downwardly to a point adjacent the flange 17. The nipple 16 is surrounded by a coiled wire 20 abutting at one end against the disk 14 and having its outer spiral 21 projecting beyond the outer end 19 of the nipple 16. The outer spiral 21 of the coiled wire 20 serves to guide the tapered projection 3 of the candle body B during insertion of the latter into the cup without scraping the wax of the lateral faces of said projection 3. The longitudinal slots 18 admit combustion air to the wick 6 when the level of the candle B is down to below the outer end of the nipple 16.

Figure 7:
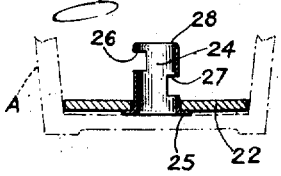
Figure 7 is a section of a third embodiment of the adapter according to the invention.
Figure 8:
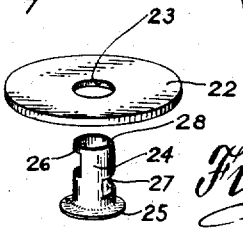
Figure 8 is an exploded perspective view of the third embodiment.
Figure 1:
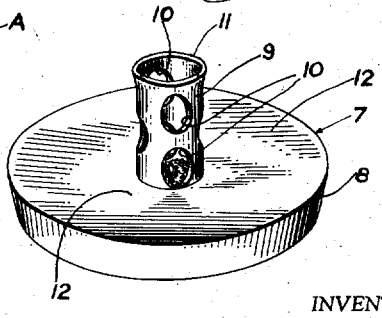
Figure 1 is a perspective view of one embodiment of the adapter according to the invention.

Figures 7 and 8 show still another embodiment of the adapter according to the invention. Said embodiment consists in a thin metal disk 22 provided with a central hole 23 adapted to receive the nipple 24 which is provided at one end with a flange 25 for abutting the edge of the hole 23. The nipple 24 is provided with two lateral rectangular openings 26 and 27 for combustion air, which are disposed near the outer end 28 of the nipple 24 and adjacent the disk 22 respectively. The adapter embodiments, shown in Figures 5 to 8, are less expensive to manufacture than the adapter embodiment shown in Figures 3 and 4, because it is not necessary to make the holes 15 and 23 and the nipples 16 and 24 with as small tolerances as those needed for the tube 9 and disk 7, and also because the disks 14 and 22 need not be as thick as the disk 7.

While preferred embodiments according to the present invention have been illustrated and described it is understood that various modifications may be resorted to without departing from the spirit and scope of the appended claims.

We claim:

1. In a votive candle in combination, a container, a body of fuel, a wick in said body, the base of said body having an [announced] *annular* recess to define a body projection extending from the bottom of said recess and containing a part of said wick, and a plate member adapted to be disposed in the bottom of said container and having an upstanding tubular projection adapted to removably engage said body recess and to surround said body projection.

2. In a votive candle, in combination, a container, a body of fuel adapted to be disposed in said container, a wick in said body, the base of said body having a deep annular recess to define a body projection extending from the bottom of said recess and containing a part of said wick, and a plate member adapted to be disposed in the bottom of the container and having an upstanding tubular projection adapted to engage said body recess and surround said body projection, said tubular projection having lateral openings for admission of combustion air.

3. In a votive candle, in combination, a container, a body of fuel, a wick in said body, the base of said body having a deep annular recess to define a tapered body projection extending from the bottom of said recess to a point short of said base, said body projection containing a part of said wick, and a plate member adapted to be disposed at the bottom of the container and having an upstanding tubular projection adapted to engage said body recess and surround said tapered body projection, and having lateral openings therein for admission of combustion air.

4. In a votive candle, in combination, a container, a body of fuel adapted to be disposed in said container, a wick in said body, the base of said body having a deep annular recess to define a body projection extending from the bottom of said recess downwardly to a point short of the base of said body and containing a part of said wick, a disk having an opening in the center thereof, said disk adapted to be disposed in the bottom of the container, and a flanged nipple removably engaging said disk hole and upstanding within said body recess to surround said body projection.

*5. In a votive candle, the combination of: an open topped container having a bottom wall and an imperforate transparent side wall; means in the bottom of the container defining a centrally disposed upstanding socket which projects upwardly from the bottom of the container a distance considerably less than the height of the container side wall and is spaced inwardly of the side wall; a body of fuel in the container with a portion thereof received in the socket; a wick in the body of fuel extending all the way down through that portion of the fuel body which is received in the socket; said body of fuel having a height less than that of the container side wall; and the socket having an air inlet port leading to the bottom thereof to conduct air for combustion into the socket to assure that the socket will be empty upon completion of combustion.*

*6. The combination set forth in claim 5 further characterized by the fact that the means defining the socket comprises a metal disk of a size to cover substantially the entire bottom of the container, and a tubular element fixed to the center of the disk and projecting upwardly therefrom, said tubular element having an opening in its bottom portion to provide the air inlet port.*

References Cited in the file of this patent or the original patent

UNITED STATES PATENTS

| | | |
|---|---|---|
| 1,309,545 | Reicher | July 8, 1919 |
| 1,320,109 | Woosler | Oct. 28, 1919 |